Patented Jan. 21, 1930

1,744,256

UNITED STATES PATENT OFFICE

RAYMOND C. BENNER, OF BAYSIDE, AND JOHN H. FINK, OF BROOKLYN, NEW YORK, ASSIGNORS, BY MESNE ASSIGNMENTS, TO PREST-O-LITE STORAGE BATTERY CORPORATION, A CORPORATION OF INDIANA

BONDED-FIBER SEPARATOR AND PROCESS OF MAKING THE SAME

No Drawing.    Application filed July 12, 1923.    Serial No. 651,164.

This invention relates to the manufacture of electrode separators comprising fibrous material bonded by a suitable agent, especially a plastic such as rubber deposited from solution in a volatile solvent. Principal objects of the invention are to provide improved methods and compositions for making up such separators for storage battery use, and to prevent the formation of relatively impervious surface layers when the volatile solvent is expelled from the separators. In a preferred embodiment, the method used involves the extrusion of the separators and the composition includes bonded "hydrated" fiber.

In an application Serial No. 628,375, filed March 28, 1923, by R. C. Benner, the manufacture of separators from masses of plastic-bonded and plastic-impregnated fibers is described. In the process of that application, fibrous material, preferably dry cellulosic fibers, is combined with a binder, as by mixing the fiber with a plastic or viscous composition comprising rubber and a solvent. When rubber is used, a vulcanizing agent is added to the batch. The composition is then formed into masses of such size and shape that they may be conveniently sliced into a plurality of sheets, or used in the extrusion, stamping, or molding of separators having other forms. The rubber-bonded masses are partly vulcanized before being sliced or otherwise severed. After the separator sheets are formed the vulcanization is completed.

Stiff, strong separators of high porosity are produced in this way. Among the distinctive advantages of such separators is the presence of multitudinous tortuous pores, as distinguished from the relatively limited number of substantially rectilinear pores which are characteristic of prior separators formed from textile fabric embedded in rubber.

We have discovered that marked advantages may be obtained in the manufacture of separators of this general type by the use of fiber containing water in excess of the amount normally present in the fiber. It is desirable to cause the fiber to become thoroughly water-soaked in any suitable way, as by agitation in water. Beating machines, such as are used in the manufacture of paper pulp, are well adapted for working up the fiber with water. Chemical combination of the water with the cellulose, in more or less definite proportions, appears to take place when the agitation is kept up for considerable time. Fiber so combined with water is sometimes referred to as "hydrated", but that term is used herein for convenience in referring to fiber containing water and without any limitation to chemical combination. The present invention includes the use of fiber associated with sufficient water to control the absorption of rubber solvent or the like by the fiber, as subsequently described. The fiber may merely contain absorbed or occluded water, or may be hydrated in the chemical sense.

One or two hours' beating with water is sufficient to hydrate the fiber sufficiently for the production of good separators. Some increase in the strength of the fibers may be obtained by long hydration. As in the process of the application referred to, sulfite pulp fiber is the preferred material for making up the separators. Other fibers having equivalent properties may be used.

After hydrating the sulfite pulp fiber to the proper extent, suitable amounts of other fibers may be added. The nature and quantity of the added materials will be determined by the characteristics desired in the separator. Stiffness may be imparted by addition of insoluble inorganic fibers, such as glass wool, and strength by addition of insoluble animal hair. Porosity is obtained by incorporating soluble fibers, for example, cotton. Also, any soluble compound which can be removed to form pores before the separator is placed in the battery, or which can be dissolved in the elecrolyte without injurious effect, may be added to insure porosity. Sodium sulfate and glycerine are mentioned by way of example. Salts which can be volatilized, such as ammonium carbonate, may also be used. From 10 to 20% of the added pore-forming material will usually be adequate, but if higher porosity is desired this amount may be increased to 50%, or even more.

When the batch is thoroughly mixed, the main portion of the water is removed by suitable means, such as a centrifugal dryer. The potential binding material is then stirred into intimate admixture with the fibers. This material desirably contains a binder of the plastic type. For example, it may be rubber latex or a solution or emulsion of rubber.

The fiber-binder composition is next transferred to a heated mixer, in which it is agitated until a substantially homogeneous mixture is obtained and the individual fibers are thoroughly coated with the plastic. Compounding ingredients, for example, lampblack, may then be added and distributed throughout the composition. Lastly the sulfur and vulcanizing accelerator are incorporated.

The plasticity of the composition is largely dependent upon the ratio of rubber solvent to water. The ratio may be easily regulated by adjusting the temperature of the mixer in accordance with the amount and vaporizing temperature of the solvent. Such temperatures may be either above or below 100° C.

The preferred plasticity varies with the use which will be made of the composition. It should be greater when extruded separators are to be prepared than when they are to be made by other processes, such as slicing, rolling, or the like. Mixtures of the kind described are particularly desirable when the shaping process requires a high plasticity, because the water which remains after the bulk of the solvent has been expelled makes the mixture readily workable. The plasticity of dry fiber-rubber compositions may be too low after the mixing and heating step, as it is necessary to expel the greater part of the solvent to prevent the formation of a relatively impervious "skin" or coating on the surface of the finished separator. This skin is formed by the evaporating solvent carrying solute to the surface of the separator and there depositing it. The presence of water insures plasticity and does not have the objectionable skin-forming effect, water not being a solvent of rubber.

The use of hydrated fiber is further desirable because a more uniform coating of individual fibers and a more homogeneous distribution of the rubber can be obtained than when dry fiber is used. In the latter case, the fibers which first come into contact with the rubber solution absorb it rapidly, and acquire a thicker coating of rubber than those fibers which subsequently reach the solution. Also, the rapid absorption results in unevenness in the individual fiber coatings. When hydrated fiber is used, the absorption by the fibers is slow, as it takes place only as the water evaporates. A uniform coating is thus produced. The homogeneous distribution of the rubber makes it possible to produce desirable separators containing a low proportion of rubber in relation to the fiber, without any appreciable impairment of the binding action. The lowered proportion of rubber is desirable because it makes possible the production of very porous separators. The cost of manufacture is also considerably reduced in this way.

When a relatively large amount of rubber solvent is allowed to remain in admixture with the hydrated fiber, or when dry fiber mixtures are used, the following procedure may be adopted to avoid the formation of a relatively impervious coating on the finished separator.

After the rubber, solvent, fiber and compounding ingredients have been mixed and the greater portion of the solvent has been driven off, the composition is formed by cutting, holding, or the like, into separators of proper shape and density. The separators are then vulcanized. It is not practical to remove all the solvent in the mixing and heating operation, and after the separators are shaped the remaining solvent is evaporated, carrying with it to the surface the contained solute, which tends to be deposited as a coating of low permeability. In order to prevent the formation of the coating, a porous or absorbent material, preferably a fabric such as paper or cloth, is laid on both sides of the separator before placing it in the vulcanizing oven or press. The separator and absorbent are preferably passed between rolls or put in a press to insure close and uniform contact of the juxtaposed surfaces. The pressed assembly is heated in the vulcanizing process until practically all the solvent is driven off, and is then withdrawn from the oven or other vulcanizing apparatus.

The evaporating solvent carries the rubber into the fabric, where it is deposited. Hence on stripping off the fabric the separator surface is left free from the clogging deposit which would otherwise be formed. Vulcanization must not be allowed to proceed too far before removing the fabric, as in this case it may be difficult to remove it, without injuring the separator. The proper time for interrupting the process is generally when substantially all of the solvent has been volatilized. Vulcanization is completed after removing the fabric.

We have discovered further that bonded fiber separators may be produced by extrusion methods with marked advantages and with avoidance of various difficulties, including the formation of impervious coatings of the kind referred to above. Masses of fiber may be heated in an extrusion press to expel the greater portion of the solvent before putting the press into operation. The solute will collect in an impervious layer at the surface from which the solvent escapes, and separators containing no objectionable amount of solvent may be extruded from other parts of the mass. The same general result may be obtained by forming the composition into a block, heating to remove the solvent, and subjecting the block to pressure to extrude material from its inner portion. Separators in the form of plane or ribbed sheets, tubes, or other shapes may be readily formed by the present extrusion method.

If rubber has been used as the binder, it is desirable to vulcanize the mass partially before driving off the solvent. Complete vulcanization is effected after the separators have been extruded.

An important advantage of the extrusion process is that a large part of the fibers arrange themselves parallel to the direction of extrusion. This gives the extruded separators a "grain". It is relatively difficult to bend them across the grain and they therefore stand up well when inserted in the battery with their grain running vertically, even though their porosity is such that if arranged differently they would not be strong enough. The separators may of course be made of sufficient strength to render it immaterial in which way they are assembled in the battery.

As noted above, particular advantages are obtained by the use of hydrated fiber compositions in the extrusion process, on account of their high plasticity even when the greater portion of the rubber solvent has been expelled. The extrusion process is not limited, however, to such compositions. The fibers may be bonded with any acid-resistant plastic which is adapted to form a mass workable by extrusion or other convenient methods. While rubber is preferred, other binders such as phenolic condensation products, celluloid, or the like, may be used.

We claim:

1. In a process of making porous separators, the following steps: hydrating fibrous material and then mixing an adhesive binding material with said hydrated fibers.

2. In a process of making porous separators, the following steps: hydrating sulfite pulp fibers and then mixing an adhesive binding material with said hydrated fibers.

3. In a process of making separators, the following steps: hydrating sulfite pulp fibers and then mixing an acid resistant plastic with said hydrated fibers.

4. Process of making separators, comprising forming a mixture of a binder carried by a volatile solvent and hydrated cellulosic fibers, expelling the greater portion of the solvent, and shaping separators from the resulting composition.

5. Process according to claim 4, in which the binder comprises rubber.

6. Process of making separators, comprising forming a mixture of rubber carried by a volatile solvent and hydrated cellulosic fibers, partially vulcanizing the mass, then expelling the greater portion of the solvent, shaping separators from the partially vulcanized mass and finally completely vulcanizing the shaped separators.

7. Process of making separators, comprising extruding the same from a mass containing bonded fibers.

8. Process according to claim 7, in which the separators are extruded in sheet form.

9. Process of making separators, comprising making a mixture of fibrous material and a bonding agent carried by a volatile solvent, forming the mixture into a coherent mass, expelling the major portion of the solvent therefrom, and thereafter extruding separators from the mass.

10. The invention according to claim 9, in which hydrated fibers are used.

11. Process of preventing formation of a relatively impermeable coating on separators formed of fibers bonded with a material dissolved in a volatile solvent, comprising expelling the greater portion of the solvent before forming the separators, whereby deposition of solute at the surface of the separator by volatilizing solvent in minimized.

12. Process of preventing formation of a relatively impermeable coating on separators formed of a composition containing fibers bonded with a material dissolved in a volatile solvent, comprising volatilizing the greater portion of the solvent from the surface of a porous material placed against the composition, whereby the solute carried by the solvent is deposited in such material.

13. Process according to claim 12, in which rubber is the binding material, and partial vulcanization is effected before removing the porous material.

14. Process according to claim 12, in which the solvent is volatilized from a fabric adapted to be removed without injury to the separator.

In testimony whereof, we affix our signatures.

RAYMOND C. BENNER.
JOHN H. FINK.